(12) United States Patent
Poirier et al.

(10) Patent No.: US 12,190,248 B2
(45) Date of Patent: Jan. 7, 2025

(54) SYSTEMS AND METHODS FOR AUTOMATED PARSING OF SCHEMATICS

(71) Applicant: C3.ai, Inc., Redwood City, CA (US)

(72) Inventors: Louis Poirier, Paris (FR); Willy Douhard, Paris (FR); Shouvik Mani, San Jose, CA (US); Dan Constantini, Paris (FR)

(73) Assignee: C3.ai, Inc., Redwood City, CA (US)

( * ) Notice: Subject to any disclaimer, the term of this patent is extended or adjusted under 35 U.S.C. 154(b) by 802 days.

(21) Appl. No.: 17/171,996

(22) Filed: Feb. 9, 2021

(65) Prior Publication Data

US 2021/0319327 A1    Oct. 14, 2021

Related U.S. Application Data

(63) Continuation of application No. PCT/US2020/050271, filed on Sep. 10, 2020.
(Continued)

(51) Int. Cl.
*G06N 3/04*    (2023.01)
*G06N 3/045*   (2023.01)
(Continued)

(52) U.S. Cl.
CPC ............ *G06N 3/088* (2013.01); *G06N 3/045* (2023.01)

(58) Field of Classification Search
None
See application file for complete search history.

(56) References Cited

U.S. PATENT DOCUMENTS 9,697,423 B1 *  7/2017  Bellert ................ G06V 30/412
2004/0024662 A1  2/2004  Gray et al.
(Continued)

FOREIGN PATENT DOCUMENTS

CA    3044461 A1    5/2020
CN    108701014 A   10/2018
(Continued)

OTHER PUBLICATIONS

Elyan, Eyad, Carlos Moreno Garcia, and Chrisina Jayne. "Symbols classification in engineering drawings." 2018 International Joint Conference on Neural Networks (IJCNN). IEEE, 2018. (Year: 2018).*
(Continued)

*Primary Examiner* — Hal Schnee
(74) *Attorney, Agent, or Firm* — Norton Rose Fulbright US LLP

(57) ABSTRACT

The present disclosure provides systems, methods, and computer program products for generating a digital representation of a system from engineering documents of the system comprising one or more schematics and a components table. An example method can comprise (a) classifying, using a deep learning algorithm, (i) each of a plurality of symbols in the one or more schematics as a component and (ii) each group of related symbols as an assembly, (b) determining connections between the components and the assemblies, (c) associating a subset of the components and the assemblies with entries in the components table; and (d) generating the digital representation of the system from the components, the assemblies, the connections, and the associations. The digital representation of the system can comprise at least a digital model of the system and a machine-readable bill of materials.

18 Claims, 12 Drawing Sheets

Related U.S. Application Data

(60) Provisional application No. 62/899,011, filed on Sep. 11, 2019.

(51) Int. Cl.
  G06N 3/08 (2023.01)
  G06N 3/088 (2023.01)

(56) References Cited

U.S. PATENT DOCUMENTS

| | | | |
|---|---|---|---|
| 2015/0112182 A1* | 4/2015 | Sharma | A61B 5/0261 600/408 |
| 2016/0161930 A1 | 6/2016 | Jirkovsk et al. | |
| 2017/0249339 A1 | 8/2017 | Lester | |
| 2019/0019020 A1 | 1/2019 | Flament et al. | |
| 2019/0080164 A1 | 3/2019 | Duke et al. | |
| 2019/0171620 A1 | 6/2019 | McCollum et al. | |
| 2020/0005094 A1* | 1/2020 | Sinha | G06V 10/454 |
| 2020/0175211 A1* | 6/2020 | Kang | G06F 30/23 |
| 2021/0357636 A1* | 11/2021 | Bao | E21B 41/00 |

FOREIGN PATENT DOCUMENTS

| | | | |
|---|---|---|---|
| CN | 109564575 A | 4/2019 | |
| EP | 3104302 A1 | 12/2016 | |
| JP | S63311581 A | 12/1988 | |
| JP | H04188378 A | 7/1992 | |
| WO | WO-2021050787 A1 | 3/2021 | |

OTHER PUBLICATIONS

Kang, Sung-O., Eul-Bum Lee, and Hum-Kyung Baek. "A digitization and conversion tool for imaged drawings to intelligent piping and instrumentation diagrams (P&ID)." Energies 12.13 (2019): 2593. (Year: 2019).*

PCT/US2020/050271 International Preliminary Report on Patentability dated Mar. 15, 2022.

Alajuela, Esteban Arroyo Esquivel aus. Capturing and Exploiting Plant Topology and Process Information as a Basis to Support Engineering and Operational Activities in Process Plants, Dissertation, Helmut Schmidt University, Hamburg, Germany (2017). 203 pages.

Moreno-García. New trends on digitisation of complex engineering drawings. Neural Computing and Applications 31:1695-1712 (2019). Published online Jun. 13, 2018.

PCT/US2020/050271 International Search Report and Written Opinion dated Dec. 16, 2020.

Van Daele et al. An Automated Engineering Assistant: Learning Parsers for Technical Drawings, arXiv:1909.8552v1 (Sep. 18, 2019). 23 pages.

European Patent Office, Communication, Extended European Search Report issued for European Patent Application No. 20863010.3, dated Sep. 7, 2023, 9 pages.

Cordella, L. P. et al. "Symbol Recognition in Documents: A Collection of Techniques?" International Journal on Document Analysis and Recognition, Dec. 2000, 16 pages.

Rahul, R. et al. "Automatic Information Extraction from Piping and Instrumentation Diagrams," Proceedings of the 8th International Conference on Pattern Recognition Applications and Methods, Jan. 2019, 10 pages.

Japanese Patent Office, Office Action issued for Japanese Patent Application No. 2022-515888, dated Jul. 3, 2024, 7 pages with English language translation.

Japanese Patent Office, Notice of Allowance issued for Japanese Patent Application No. 2022-515888, dated Nov. 11, 2004, 6 pages with English language translation.

China National Intellectual Property Office, Office Action issued for Chinese Patent Application No. 202080078310.9, dated Oct. 22, 2024, 20 pages with English language translation.

* cited by examiner

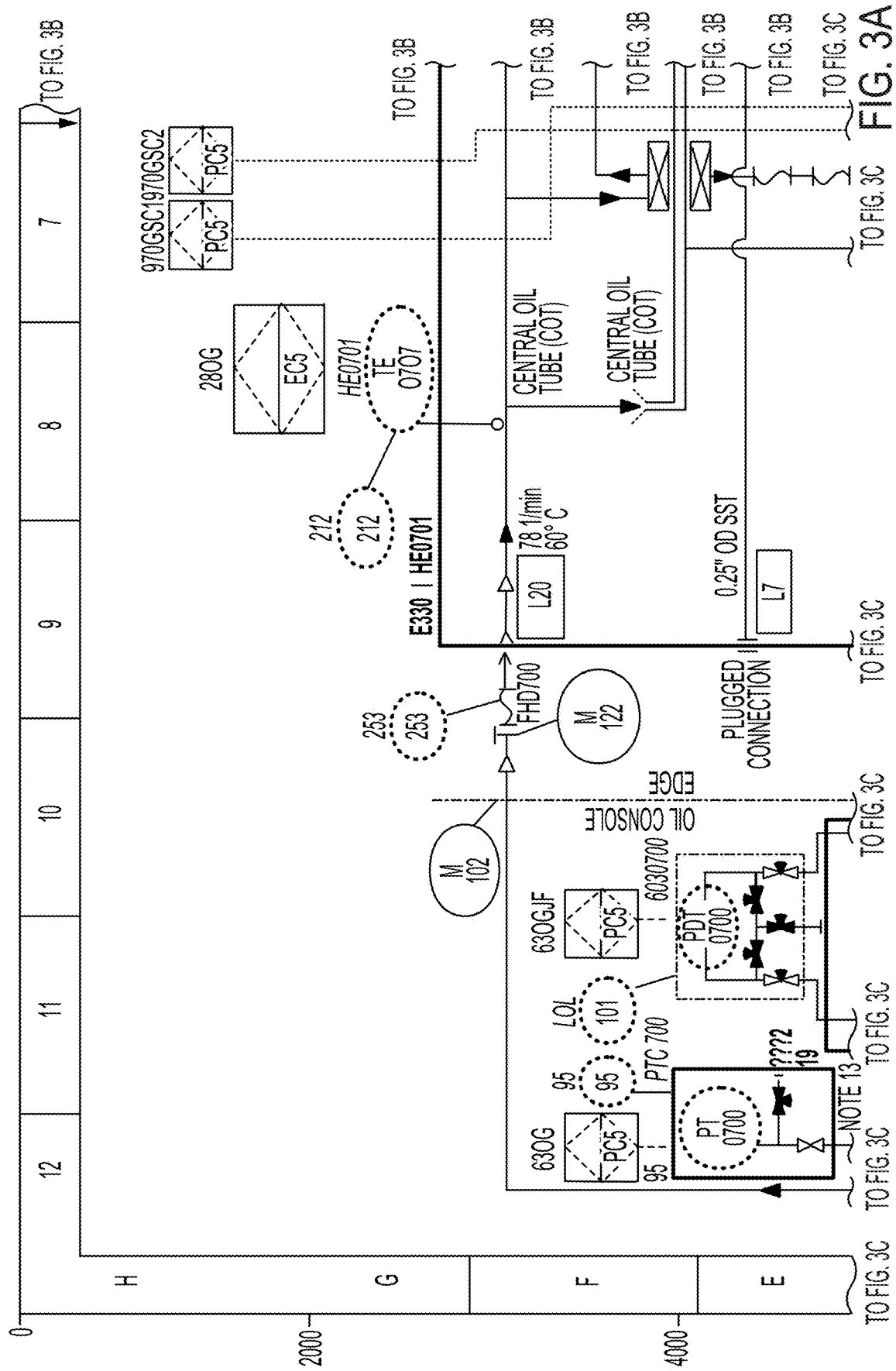

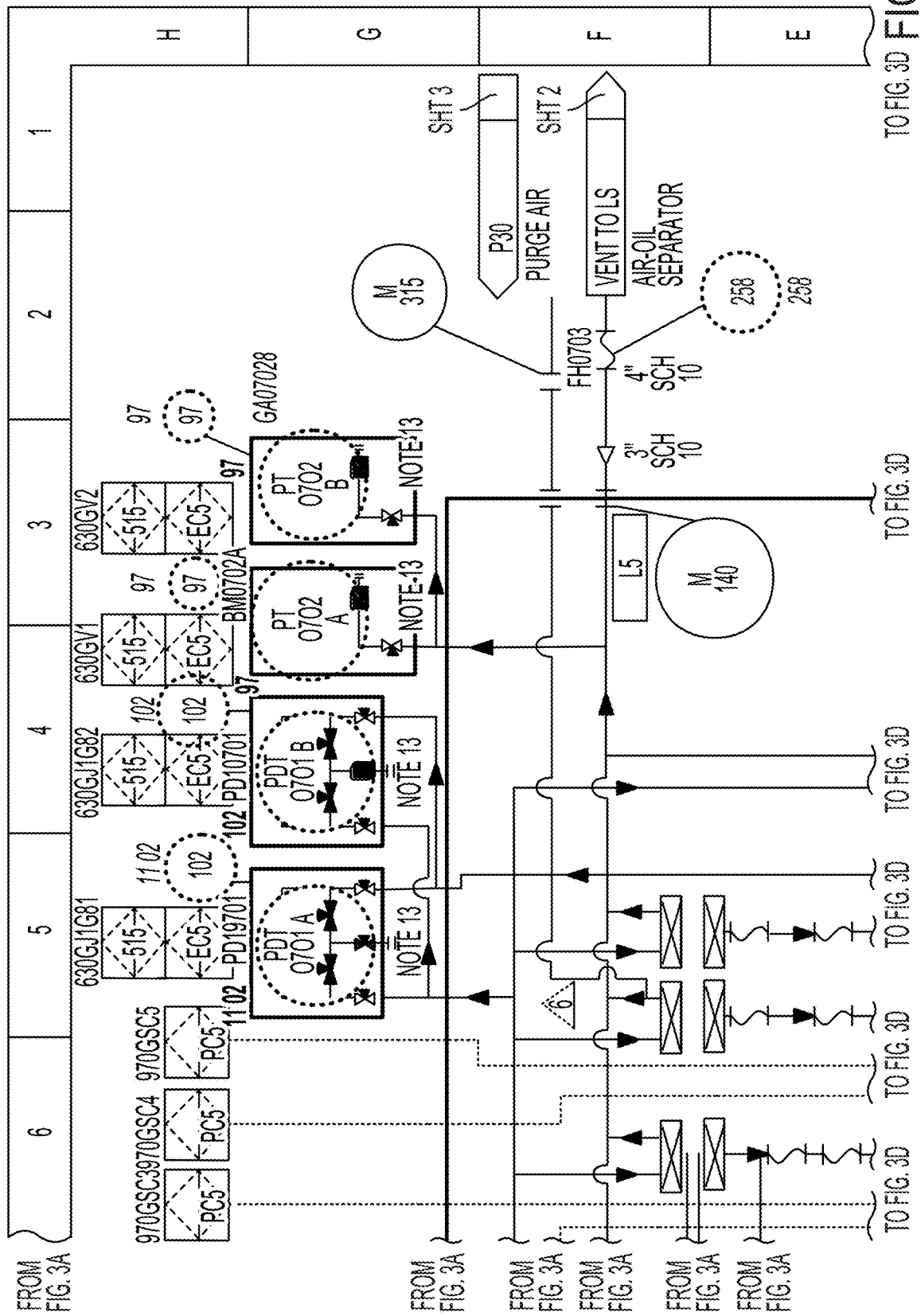

SYSTEMS AND METHODS FOR AUTOMATED PARSING OF SCHEMATICS

CROSS-REFERENCE

This application is a continuation application of International Application No. PCT/US2020/050271, filed on Sep. 10, 2020, which this application claims priority to U.S. Provisional Patent Application No. 62/899,011, filed on Sep. 11, 2019, which is incorporated herein by reference in its entirety.

BACKGROUND

Engineering documents such as schematics and piping and instrumentation diagrams may help engineers understand the constituent components of a system, how those components are connected, and how the system operates. A complete set of engineering documents for a system may include diagrams, a components table that provides more detail about particular components in the diagrams, and a list of actions taken on the system (e.g., maintenance actions, calibrations, etc.). Some or all of such engineering documents may not be digitized.

SUMMARY

The present disclosure provides systems, methods, and computer program products for generating a digital representation of a physical system from engineering documents of the physical system. The engineering documents may include non-digital schematics of the physical system and a corresponding components table. The schematics may span many different pages. The systems described herein can generate the digital representation of the physical system by detecting symbols in the non-digital schematics. The system can then use a classifier to classify each of the detected symbols as a particular component. In some cases, the detection and the classification can be performed simultaneously by a single algorithm or model, e.g., an object detection algorithm. The system can additionally classify related groups of components as assemblies, e.g., by detecting dashed lines that delineate the groups in the schematics. Thereafter, the system can determine connections between the components and the assemblies, e.g., by detecting solid lines that the connect the components and assemblies in the schematics. In some cases, the system can also associate a subset of the components and assemblies with entries in the components table. The components table may provide more detailed information about certain components that the schematics do not provide. Finally, the system can generate the digital representation of the physical system from the components, the assemblies, the connections, and the associations. The digital representation of the physical system may include a digital model of the physical system and a machine-readable bill of materials. The digital model may be computer code that defines the components, connections, and state of the physical system. The digital model may be a static model or a time-varying model.

The system described above can facilitate the quick and accurate transformation of engineering documents into a comprehensive digital model. Specifically, the system's use of deep learning to identify and classify objects in engineering documents may reduce the amount of domain knowledge (e.g., knowledge of the geometry of particular symbols used in engineering documents) required to generate such digital models. Instead, limited amounts of labeled training data can be used to generate the highly accurate deep learning models. The generality of deep learning also allows the methods described herein to be used across different industries with different types of engineering documents.

In one aspect, the present disclosure provides a method for generating a digital representation of a system from engineering documents of the system. The engineering documents may comprise one or more schematics and a components table. The method can comprise (a) classifying, using a deep learning algorithm, (i) each of a plurality of symbols in the one or more schematics as a component and (ii) each group of related symbols as an assembly; (b) determining connections between the components and the assemblies; (c) associating a subset of the components and the assemblies with entries in the components table; and (d) generating the digital representation of the system from the components, the assemblies, the connections, and the associations. The digital representation of the system may comprise at least a digital model of the system and a machine-readable bill of materials.

In some implementations, the method further comprises, prior to (a), preprocessing the one or schematics by removing white space or noise from the one or more schematics.

In some implementations, the method further comprises, prior to (a), determining a library of components to detect in the one or more schematics. In some such implementations, the method further comprises (i) determining that a respective symbol in the one or more schematics is not in the library of components and (ii) adding the respective symbol and its corresponding component to the library of components.

In some implementations, (a) comprises detecting the plurality of symbols in the one or more schematics using a binary classifier. The detecting may comprise a sliding window approach. The deep learning algorithm may comprise the binary classifier. In some implementations, (a) further comprises classifying each of the detected symbols as a component using a multi-class deep neural network. The deep learning algorithm may comprise the multi-class deep neural network. The multi-class deep neural network may be selected from the group consisting of: a feed-forward neural network and a convolutional neural network. In some implementations, a single algorithm (e.g., an object detection algorithm) performs both the detection and classification of symbols.

In some implementations, classifying each group of related symbols as an assembly comprises, for each group, detecting dashed lines in the one or more schematics that delineate the group.

In some implementations, (b) comprises detecting solid lines connecting the components and the assemblies. The solid lines can be traversed and modeled using a graph search algorithm.

In some implementations, (c) comprises: detecting and identifying, in the one or more schematics, identification numbers associated with the components and the assemblies in the subset of components and assemblies using optical character recognition; and matching the detected identification numbers with identification numbers in the components table. Detecting the identification numbers may comprise using a Hough transform.

In some implementations, the digital model can comprise computer code that defines the components, the connections, and a state of the system. The digital model can be a static model. The digital model can be a time-varying model.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

FIGS. 3A-3D are a schematic of a physical system in which detected assemblies are identified by red boxes.

DETAILED DESCRIPTION

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

The present disclosure provides systems, methods, and computer program products for generating a digital representation of a physical system from engineering documents of the physical system. Specifically, the systems described herein can generate the digital representation of the physical system by detecting symbols in non-digital schematics. The system can then use a classifier to classify each of the detected symbols as a particular component. The system can additionally classify related groups of components as assemblies, e.g., by detecting dashed lines that delineate the groups in the schematics. Thereafter, the system can determine connections between the components and the assemblies, e.g., by detecting solid lines that the connect the components and assemblies in the schematics. In some cases, the system can also associate a subset the components and assemblies with entries in a components table. The components table may provide more detailed information about certain components that the schematics do not provide. Finally, the system can generate the digital representation of the physical system from the components, the assemblies, the connections, and the associations. The digital representation of the physical system may include a digital model of the system and a machine-readable bill of materials.

Figure 1:
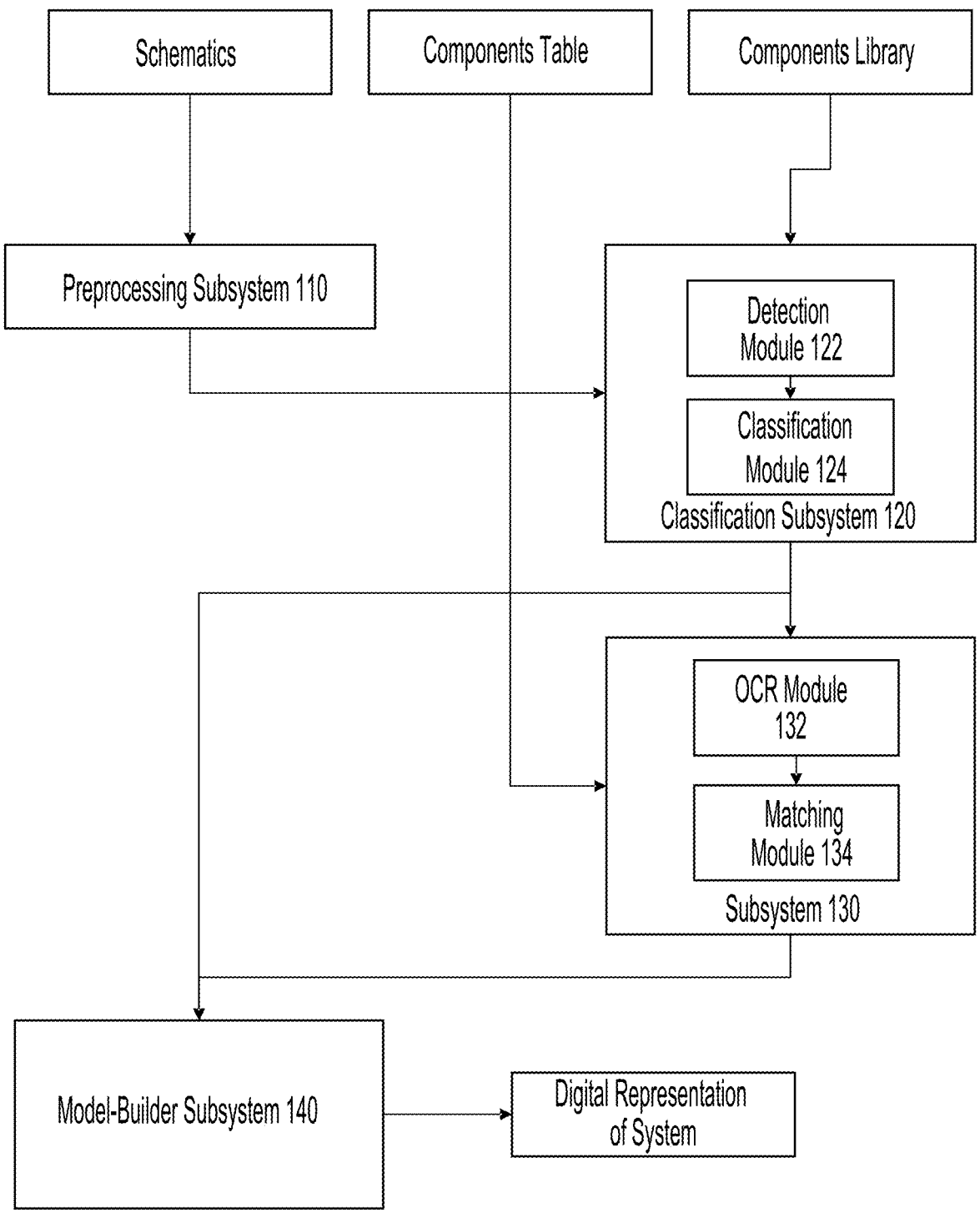
FIG. 1 schematically illustrates a system for generating a digital representation of a physical system from engineering documents of the physical system.

FIG. 1 schematically illustrates a system 100 for generating a digital representation of a physical system from engineering documents of the physical system. The physical system may be, for example, a processing pipeline. The processing pipeline may be an oil and gas processing pipeline, a chemical or material synthesis pipeline (e.g., a pipeline for synthesis of paint, fertilizer, textiles, rubber, steel, or aluminum), a drug synthesis pipeline, or a food production pipeline, to name a few examples. The physical system may alternatively be a mechanical system, a building, infrastructure (e.g., a road, bridge, electric grid, or municipal water system), a vehicle, an electronic device, a circuit, or the like. In general, the physical system may be any system that can be represented by schematics or diagrams.

The engineering documents may include non-digital (e.g., paper) schematics of the physical system, a corresponding components table, and a list of actions taken on the physical system (e.g., maintenance actions, calibrations, etc.).

The system 100 may have a preprocessing subsystem 110. In general, the preprocessing subsystem 110 can clean schematics to make subsequent processing steps easier. For example, the preprocessing subsystem 110 can scan physical copies of schematics into digital images (e.g. portable network graphics (PNGs) or JPEGs), resize or change the color of the images, remove borders, whitespace, and other noise from the images, and remove non-symbol text from the images. In this disclosure, digital images of schematics may be referred to simply as schematics.

The system 100 may also include a classification subsystem 120. The classification subsystem 120 can receive the preprocessed schematics and detect and classify the symbols, assemblies (e.g., related groups of symbols), and connections in the schematics.

The classification subsystem 120 may have a detection module 122 and a classification module 124. The detection module 122 may be configured detect symbols and assemblies in the schematics. That is, the detection module 122 may be configured to distinguish between portions of the schematics that contain symbols and assemblies and portions that do not. To detect symbols in the schematics, the detection module 122 can implement a binary classifier that is configured to generate an output that indicates that a particular portion of a schematic is or is not a symbol. The binary classifier may be a deep neural network, e.g., a feedforward neural network or a convolutional neural network (CNN), or it may be a support vector machine (SVM), an autoencoder, or any other machine learning algorithm or approach. In one example, the binary classifier is a CNN. The CNN may have at least about 1, 2, 3, 4, 5, 6, 7, 8, 9, 10, or more convolutional layers. ReLU activations and max pooling layers may be interspersed between the convolutional layers. The CNN may also have fully-connected layers. The output layer of the CNN may have a sigmoid or softmax activation that produces a probability.

Figure 2:
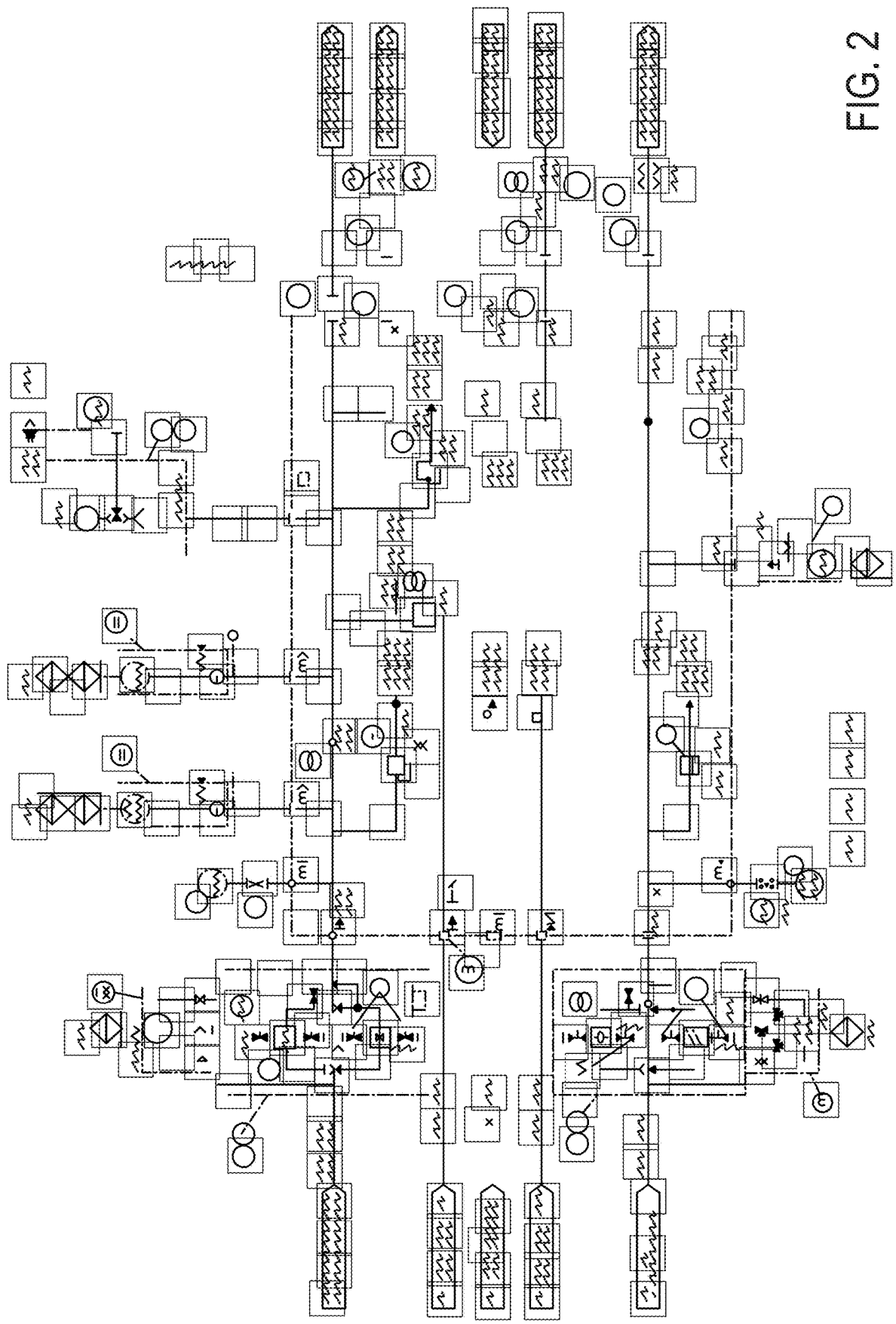
FIG. 2 is a schematic of a physical system in which detected symbols are identified by red boxes.
Figure 3C:
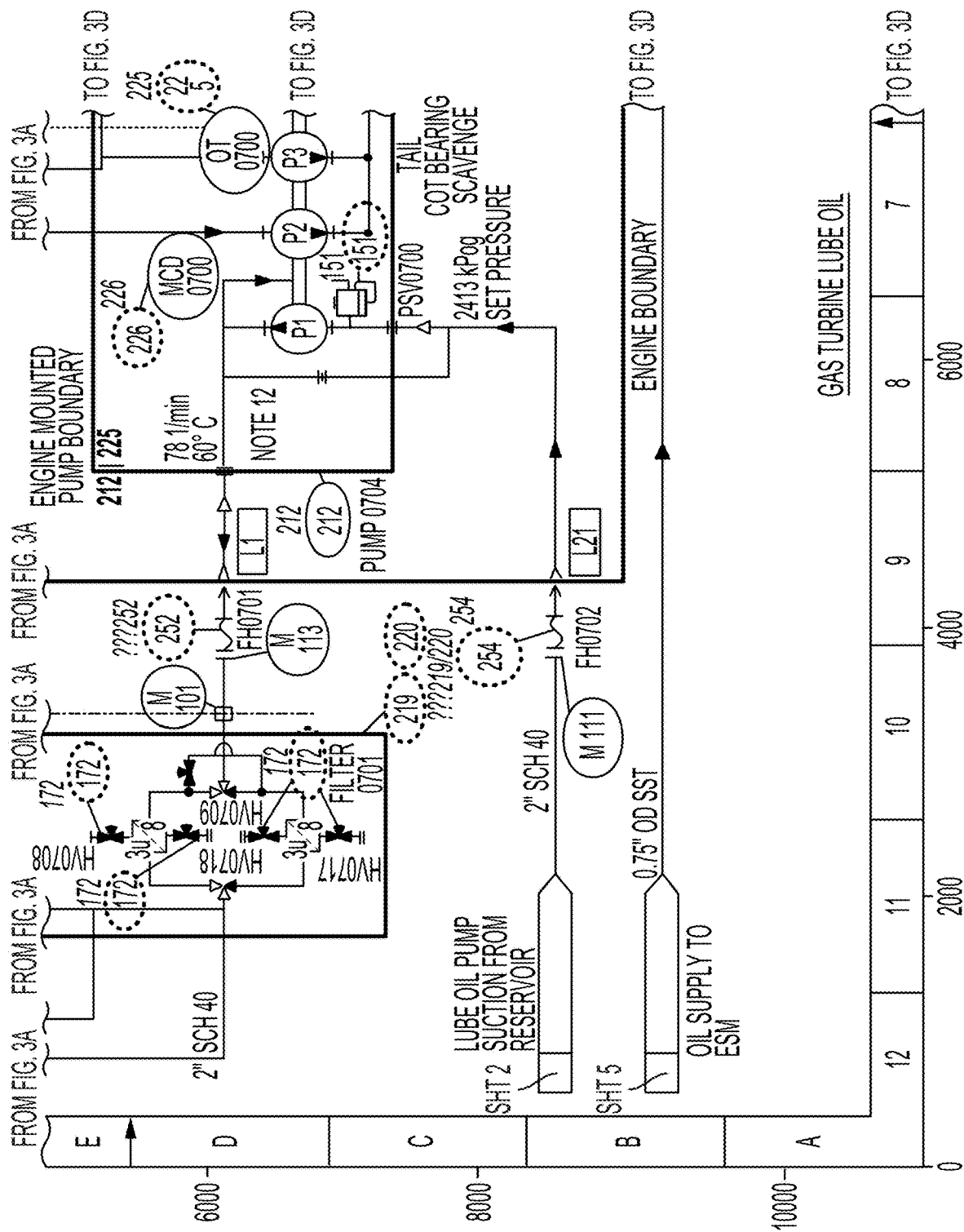
Figure 3D:
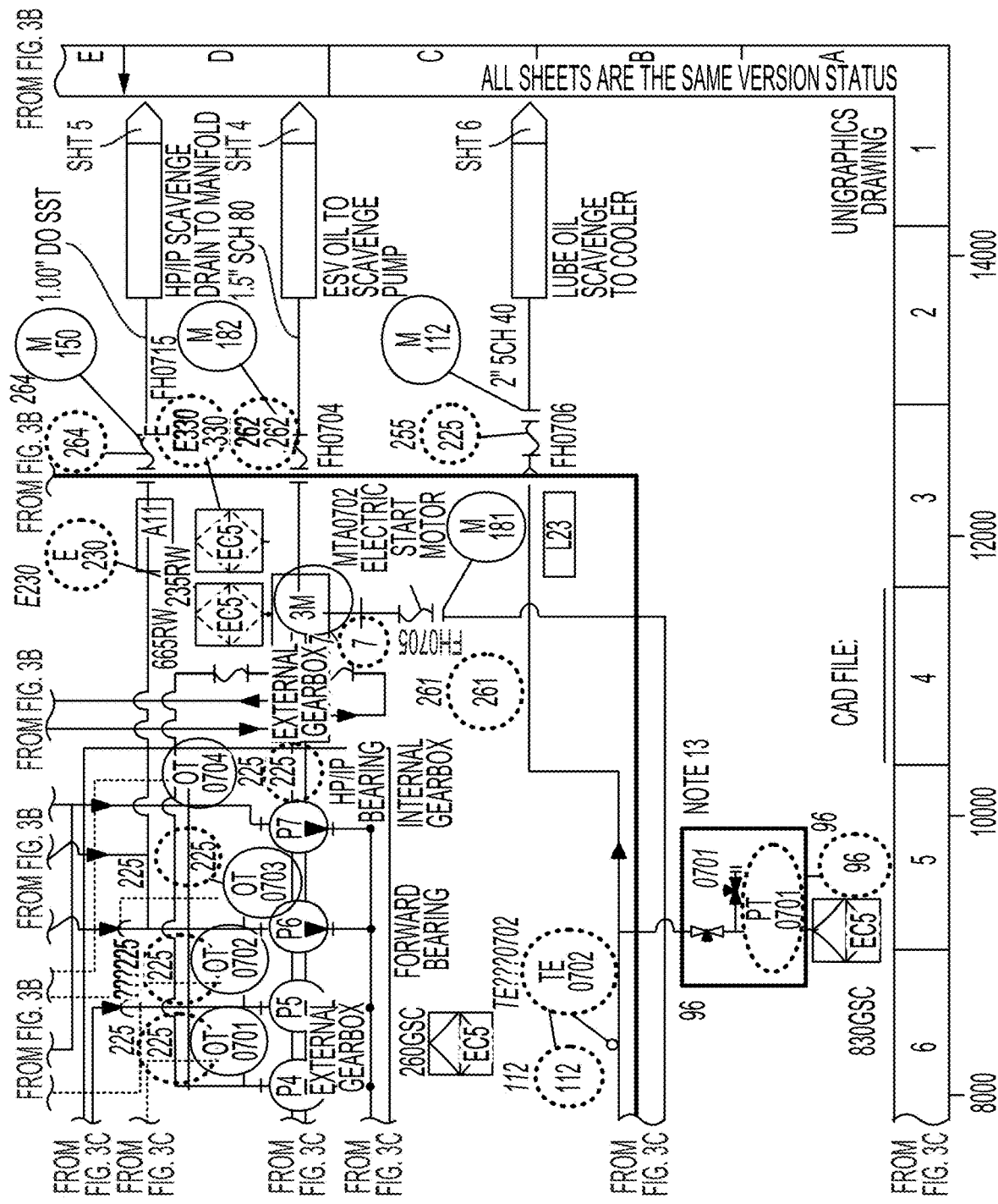
Figure 4A:
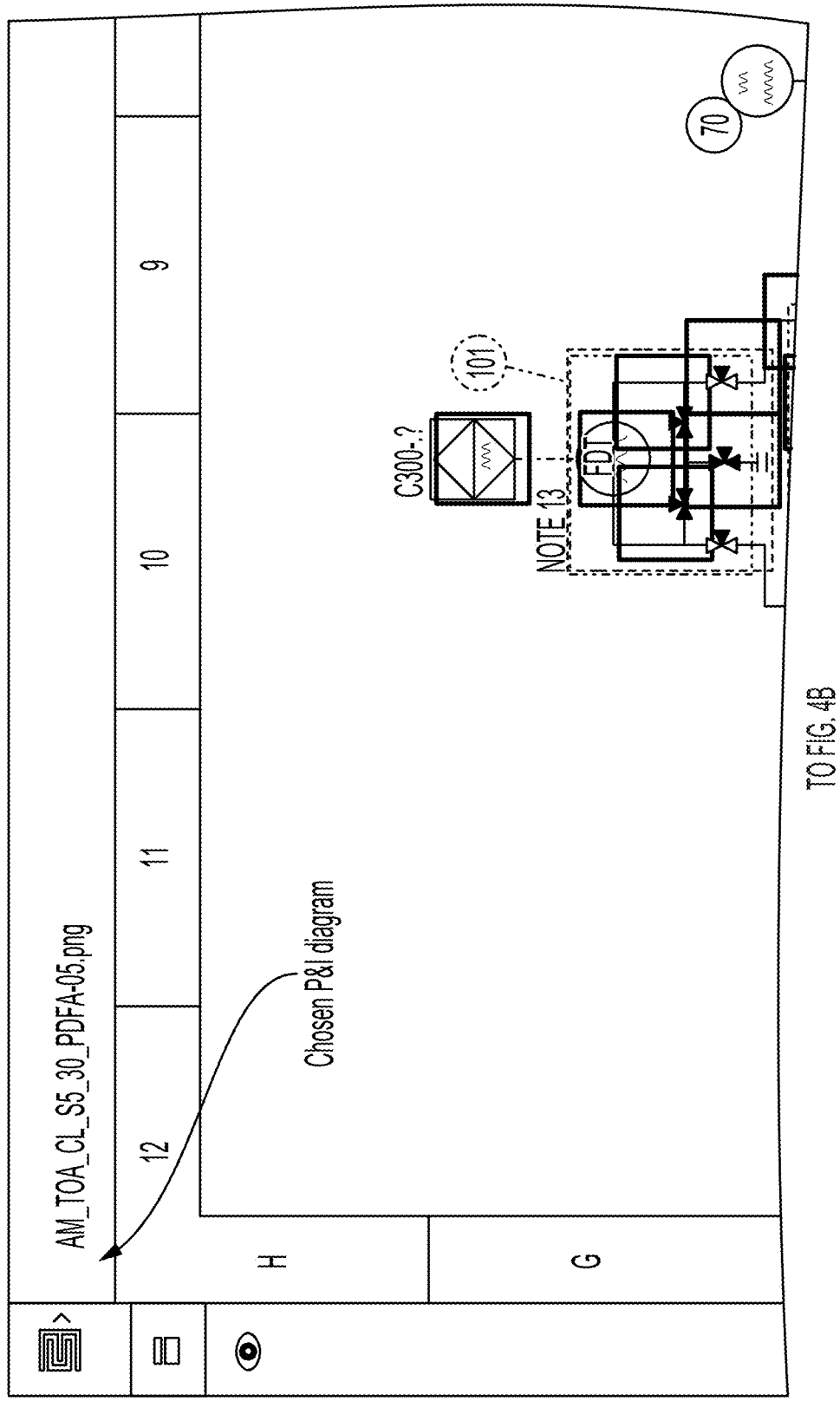
FIGS. 4A-4D show an example digital model as displayed in a user interface of an application.
Figure 4B:
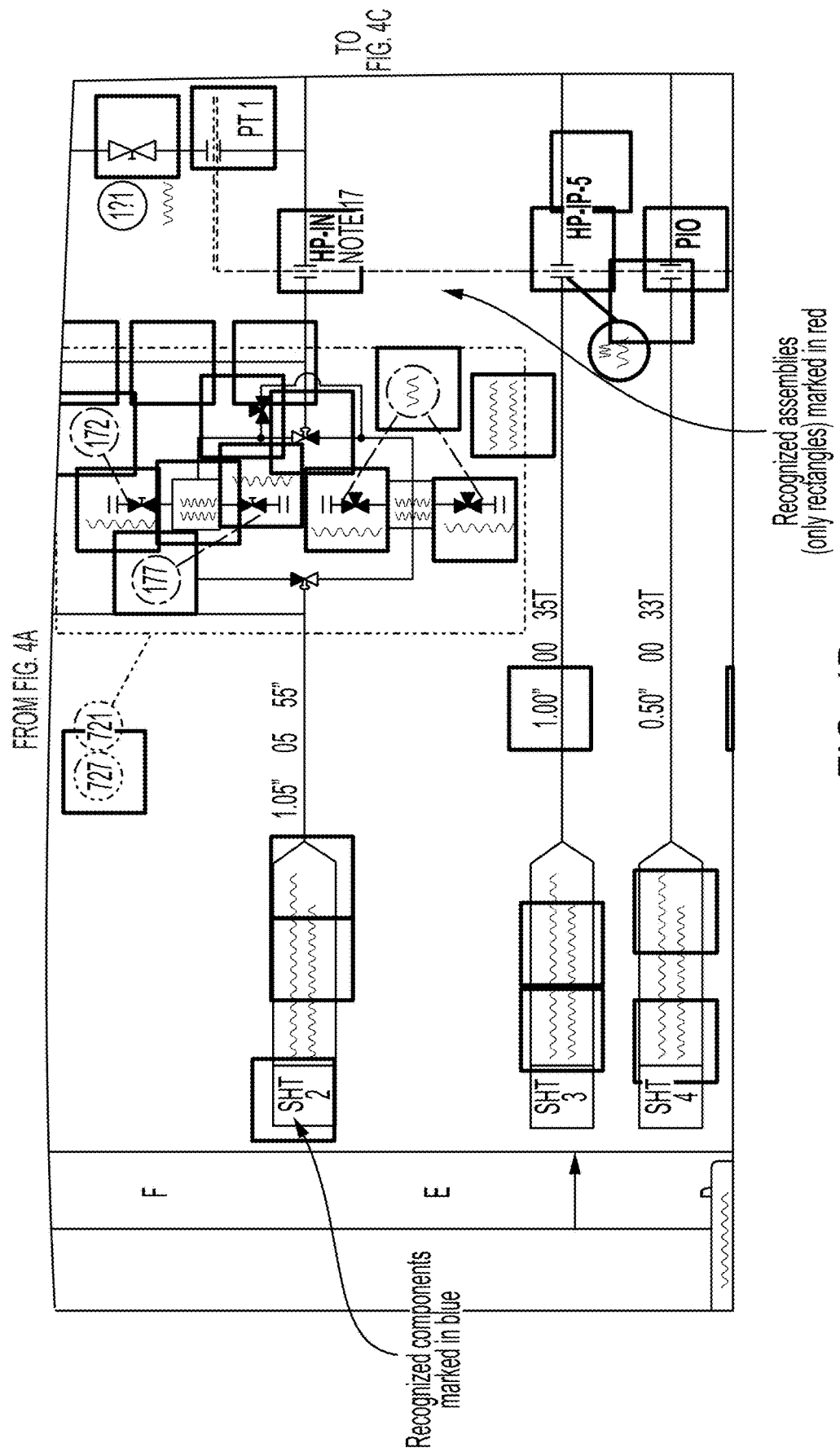
Figure 4C:
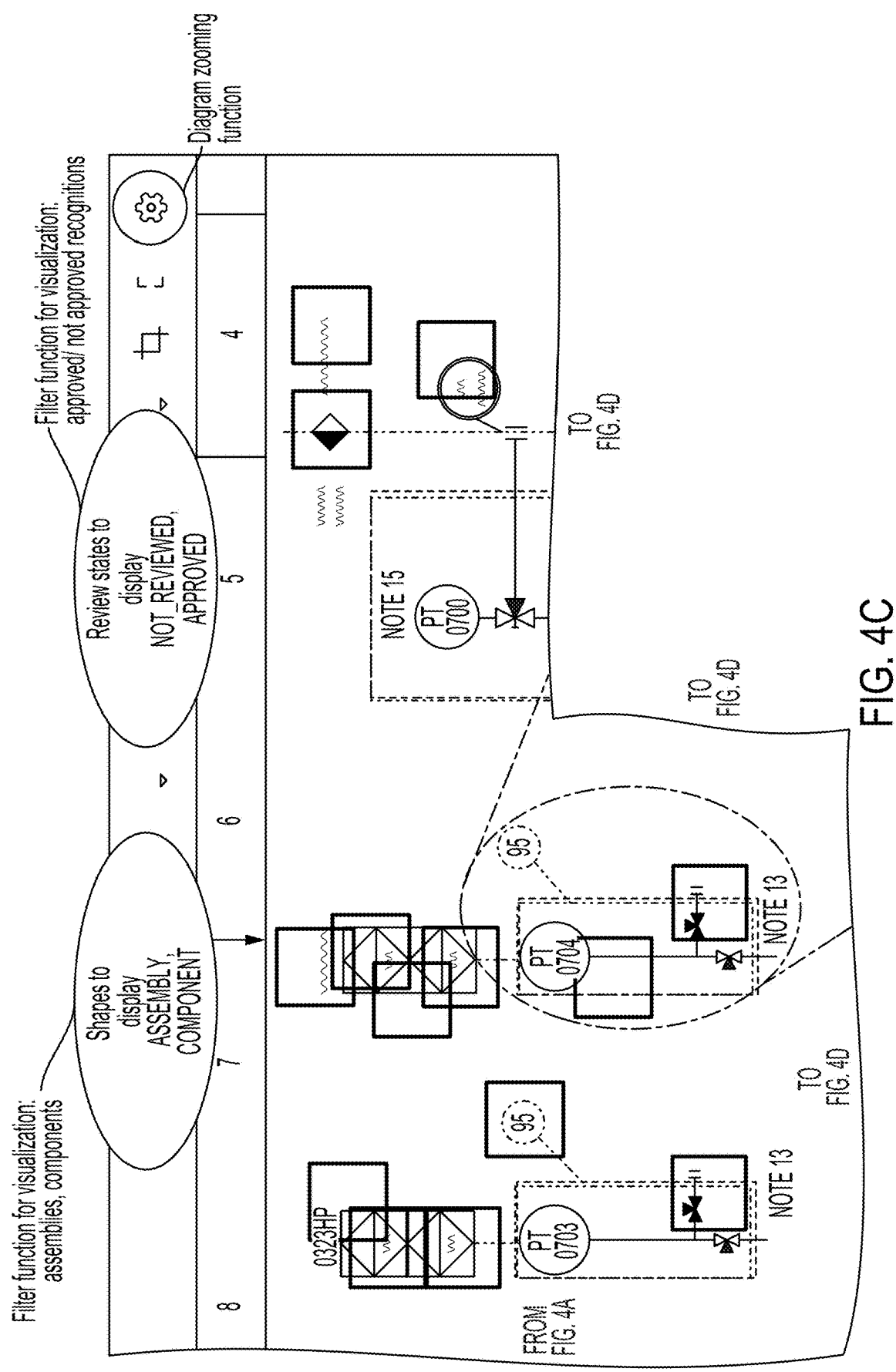
Figure 4D:
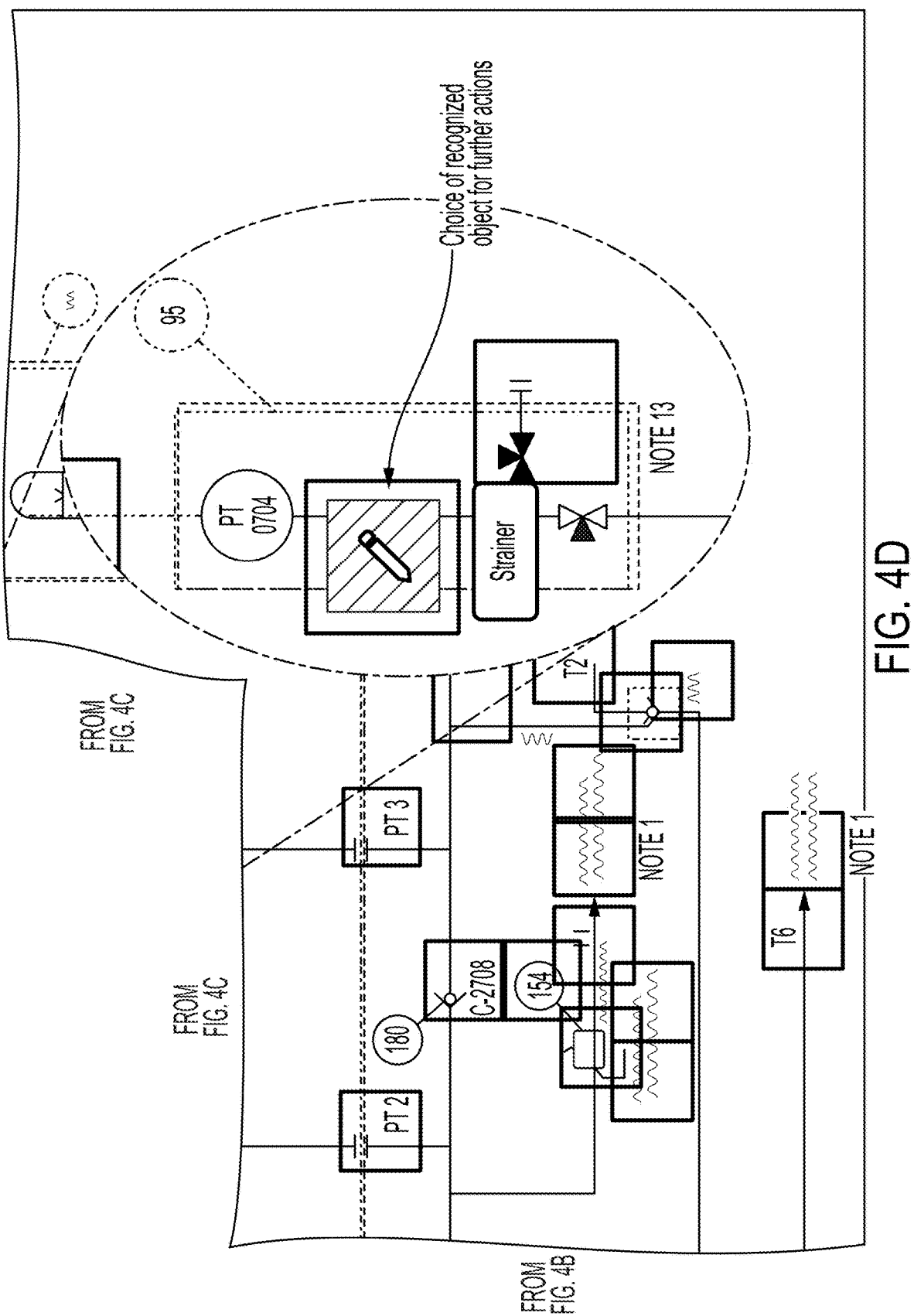

The binary classifier may be trained using a supervised, semi-supervised, or unsupervised learning process. In one implementation, the binary classifier can be trained on a small amount of labeled training data (e.g., schematics in which portions of the schematics are labeled as containing or not containing a symbol) and a large amount of unlabeled training data (e.g., schematics in which portions of the schematics are not labeled as containing or not containing a symbol). FIG. 2 is a schematic of a physical system in which detected symbols are identified by red boxes.

In some cases, the detection module 122 may implement a three-way classifier instead of a binary classifier. The three-way classifier may have a similar structure and function as the binary classifier, but may classify areas within schematics as (1) containing tags (i.e., digital representations of sensors commonly represented by a circle inscribed in a square), (2) containing locally mounted instruments (i.e., physical instrument such as a pressure gauge or temperature reading, commonly represented by a circle), or (3) containing no symbol. Tags and LMIs are important because they often have corresponding entries in time series sensor databases.

To detect symbols in the schematics, the detection module 122 may use a sliding window approach. That is, a particular schematic may be divided into a plurality of overlapping windows. The classifiers described above may return an output for each window. The output for each window may indicate whether the window has or does not have at least a portion of a symbol within its boundaries, or whether the window contains a tag, LMI, or no symbol. The size and stride of a sliding window may be based in part on the average or median size of a symbol, or any other statistical metric or heuristic. In one example, the window may be 100 pixels by 100 pixels. In the case of the sliding window approach, the outputs of the binary classifier may undergo a post-processing step before classification as a particular component. For example, a non-maximum suppression algorithm may be applied to the outputs to filter out one or more of multiple windows that have the same symbol (e.g., due to window overlap).

To detect assemblies in the schematics, the detection module 122 can implement an algorithm configured to detect dashed lines that delineate groups of symbols. Such dashed lines may indicate that the symbols are constituent components of an assembly. FIGS. 3A-3D are a schematic of a physical system in which detected assemblies are identified by red boxes.

To detect connections in the schematics, the detection module 122 can implement a similar algorithm that is configured to detect solid lines that connect the components and assemblies. In one example, the detection module 122 uses a graph search algorithm to traverse the components and the solid lines that represent the connections between the components. The graph search algorithm can traverse the components and solid lines by detecting and following adjacent black pixels in the schematics. Black pixels may be pixels that satisfy a threshold pixel intensity. The graph search algorithm can represent the pixels as nodes of a graph. A particular pixel may or may not be part of a component, and this information can be contained in the node corresponding to that pixel. Symbols are represented in the graph as a collection of nodes corresponding to the pixels that form the symbols. The graph's edges may be links between neighboring pixels with a maximum of eight edges per node. Symbols are represented in the graph as a collection of nodes corresponding to the pixels that form the symbol.

With this graph representation of the diagram, connections between symbols can be identified through a depth first search (DFS). Specifically, for each detected symbol, a DFS is initialized from one of the nodes in the symbol. The DFS traverses the diagram graph along its black nodes, hitting (and keeping track of) connected symbols along its path. The search terminates once all valid paths are exhausted.

The classification module 124, meanwhile, may be configured to classify the detected symbols as components. To classify symbols as components, the classification module 124 can implement a multi-class deep neural network that is configured to generate an output that indicates which of a plurality of components a particular symbol corresponds to. The plurality of components can be determined prior to training the multi-class deep neural network. The components can be stored in a components library. If, during classification, the multi-class deep neural network fails to classify a particular symbol as a component, that may indicate that the symbol is a new symbol. The new symbol can be added to the components library.

The multi-class deep neural network may be a feed forward neural network or a CNN, for example. The multi-class deep neural network can be trained using a supervised, semi-supervised, or unsupervised learning process. In one implementation, the multi-class deep neural network can be trained on a small amount of labeled training data (e.g., schematics in which symbols are labeled as corresponding particular components) and a large amount of unlabeled training data (e.g., schematics in which symbols are not labeled as corresponding to particular components).

In general, the neural networks described herein can employ multiple layers of operations to predict one or more outputs from one or more inputs. Neural networks may include one or more hidden layers situated between an input layer and an output layer. The output of each layer may serve as input to another layer, e.g., the next hidden layer or the output layer. Each layer of a neural network can specify one or more transformation operations to be performed on input to the layer. Such transformation operations may be referred to as neurons. The output of a particular neuron may be a weighted sum of the inputs to the neuron, adjusted with a bias and multiplied by an activation function, e.g., a rectified linear unit (ReLU) or a sigmoid function. Training a neural network may involve providing inputs to an untrained or partially trained version of the neural network to generate predicted outputs, comparing the predicted outputs to expected outputs, and updating the algorithm's weights and biases to account for the difference between the predicted outputs and the expected outputs. Specifically, a cost function can be used to calculate a difference between the predicted outputs and the expected outputs. By computing the derivative of the cost function with respect to the weights and biases of the network, the weights and biases can be iteratively adjusted over multiple cycles to minimize the cost function. Training may be complete when the predicted outputs satisfy a convergence condition, such as obtaining a small magnitude of calculated cost.

CNNs are neural networks in which neurons in some layers, called convolutional layers, receive pixels from only small portions of the input data set. These small portions may be referred to as the neurons' receptive fields. Each neuron in such a convolutional layer may have the same weights. In this way, the convolutional layer can detect features in any portion of the input data set. CNNs may also have pooling layers that combine the outputs of neuron clusters in convolutional layers and fully-connected layers that are similar to traditional layers in a feed-forward neural network. CNNs may be particularly good at detecting and classifying object (e.g., products) in images.

In some cases, the classification module 124 can instead implement an autoencoder to classify symbols. The autoencoder may comprise an encoder and a decoder. The encoder may be configured to generate a compressed representation of an input symbol, and the decoder may be configured to reconstruct the input symbol from the compressed representation. The decoder may be trained (e.g., through a supervised learning process) on examples of known symbols. The classification module 124 can compare (e.g., using a distance-based algorithm (e.g., cosine similarity)) the output of the decoder for a given input symbol to known signatures for a variety of components in a components library. The symbol may be classified as the component with the most similar, or closest, signature.

In some cases, a single object detection algorithm can both detect and classify symbols. Such an object detection algorithm may take any of the forms described above.

The classification system 120 can provide the classified components and assemblies to a subsystem 130. The subsystem 130 can also receive the components table of the physical system. The subsystem 130 can be configured to associate some or all of the components and assemblies with entries in the components table. The components table can provide additional information about the components that does not appear in the schematics, e.g., the size of a capacitor or the composition of a material.

The subsystem 130 may have an optical character recognition (OCR) module 132. The OCR module 132 may implement an OCR algorithm that is configured to recognize text associated with the classified components and assemblies. More specifically, the OCR algorithm may be configured to detect and identify identification numbers associated with the components and assemblies. In some cases, the identification numbers can be located in circles adjacent to or otherwise near the classified components and assemblies. In such cases, the subsystem 130 can detect the circles using a Hough transform. The OCR algorithm can additionally recognize text, including identification numbers and other data, in the components table. In some cases, text can be detected using Efficient and Accurate Scene Text Detector (EAST), which is a pipeline that uses a neural network to produce bounding boxes where text is present in an image.

The identification numbers in the schematics can correspond to the identification numbers in the components table. The OCR module 132 can provide the identification numbers from the schematics to a matching module 134, which can match such identification numbers with identification numbers in the components table, thereby associating the corresponding components and assemblies with entries in the components table.

The system 100 can additionally include a model-builder subsystem 140. The model-builder subsystem 140 can receive the classified components, assemblies, and connections from the classification subsystem 120 and the associations from subsystem 130 and generate a digital representation of the physical system. The digital representation of the physical system may include a digital model of the physical system and a machine-readable bill of materials. The machine-readable bill of materials may be an asset hierarchy table that identifies the various components in a schematic or a set of schematics, text associated with the components, and components that are connected to each component. The digital model may be computer code that the defines the components in the physical system, the connections between the components, and the state of the physical system. The components may be further defined by their parameters (e.g., dimensions, function, inputs and outputs, throughput, operating variables, etc.), which may be stored in the components library and retrieved when the digital model is created. The digital model can be a time-varying model or a static model.

The system of FIG. 1 and its components can be implemented on one or more computing devices. The computing devices can be servers, desktop or laptop computers, electronic tablets, mobile devices, or the like. The computing devices can be located in one or more locations. The computing devices can have general-purpose processors, graphics processing units (GPU), application-specific integrated circuits (ASIC), field-programmable gate-arrays (FPGA), or the like. The computing devices can additionally have memory, e.g., dynamic or static random-access memory, read-only memory, flash memory, hard drives, or the like. The memory can be configured to store instructions that, upon execution, cause the computing devices to implement the functionality of the preprocessing subsystem 110, the classification subsystem 120, the subsystem 130, or the model-builder subsystem 140. The computing devices can additionally have network communication devices. The network communication devices can enable the computing devices to communicate with each other and with any number of user devices, over a network. The network can be a wired or wireless network. For example, the network can be a fiber optic network, Ethernet® network, a satellite network, a cellular network, a Wi-Fi® network, a Bluetooth® network, or the like. In other implementations, the computing devices can be several distributed computing devices that are accessible through the Internet. Such computing devices may be considered cloud computing devices.

FIGS. 4A-4D show an example of a digital model as displayed in a user interface of an application. The user interface can allow a user to validate the digital model. The user interface can show recognized components in blue and recognized assemblies in red. The user interface can enable the user to filter components and assemblies by type or by status (e.g., classified or unclassified). The user interface can also enable the user to manually reclassify the components and assemblies or edit other parameters of the components and assemblies.

Figure 5:
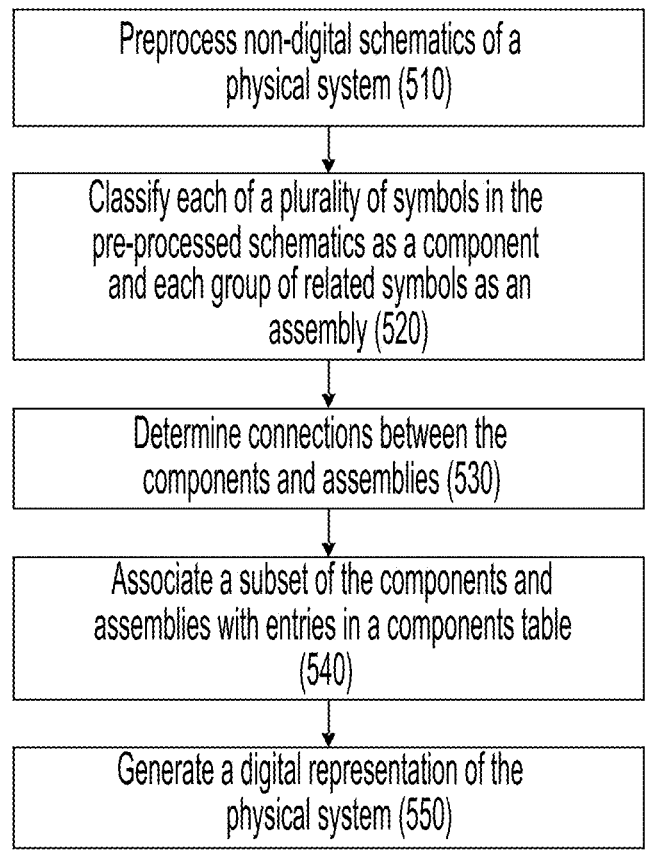
FIG. 5 is flow chart of an example process for generating a digital representation of a physical system from engineering documents of the physical system.

FIG. 5 is flow chart of an example process for generating a digital representation of a physical system from engineering documents of the physical system. The engineering documents may be non-digital (e.g., paper) schematics of the physical and a corresponding components table. The process can be performed by a system of one or more computers appropriately programmed computer in one or more locations.

The system can preprocess the non-digital schematics (510). Preprocessing the non-digital schematics may involve scanning the non-digital schematics into digital images and removing whitespace and other noise from the digital images.

The system can classify, using a machine learning algorithm, (i) each of a plurality of symbols in the pre-processed schematics as a component and (ii) each group of related symbols as an assembly (510). The machine learning algorithm may comprise a binary classifier and a multi-class deep neural network or autoencoder, and classifying the symbols as components may involve detecting the symbols using the binary classifier and classifying each of the symbols as components using the multi-class deep neural network or autoencoder. The multi-class deep neural network may be a feed-forward neural network or a convolutional neural network. The multi-class deep neural network can be trained using a semi-supervised learning process. The classes of the multi-class deep neural network can be determined prior to training. The classes may be components that are typically found in engineering documents of that type. If a respective symbol in one of the schematics is not in the components library, the system can add the corresponding component to the library. In some cases, the system can implement a single object detection algorithm that simultaneously detects and classifies symbols as components. Classifying each group of related symbols as an assembly can comprise, for each group, detecting dashed lines in the one or more schematics that delineate the group.

The system can determine connections between the components, between the assemblies, and between the components and assemblies by detecting and traversing solid lines connecting these various combinations (530). The system can traverse the solid lines using a graph search algorithm, as previously described.

The system can associate a subset of the components and assemblies with entries in the components table by (i) detecting and identifying, in the schematics, identification numbers associated with the components and the assemblies using optical character recognition and (ii) matching the detected identification numbers with identification numbers in the components table. (540). Detecting and identifying the identification numbers can involve using a Hough transform to identify circles in which those identification numbers are located. The circles can be adjacent to or otherwise near corresponding components in the schematics.

Using the classified components and assemblies, the connections, and the associations, the system can generate a digital representation of the physical system (550). The digital representation can include a digital model of the physical system and a machine-readable bill of materials. The digital model can be computer code that defines the components, the connections, and a state of the physical system. The digital model can be static model or a time-varying model.

EXAMPLE

In one example, a system as described herein has as a three-way CNN classifier for classifying areas of schematics as containing a tag, an LMI, or no symbol. The CNN has three convolutional layers interspersed between ReLU activations and max pooling layers, followed by two fully-connected dense layers. The first hidden layer has 64 units with ReLU activations. The final output layer has three units with softmax activations to predict the probability that the input image belonged to each of the three classes. The CNN was trained on 18 labeled piping and instrumentation diagrams, including 308 tag crops and 687 LMI crops. The training examples were augmented by rotating, shifting, shearing, zooming, and flipping to make the CNN invariant to these transformations. Dropout was applied in the dense layers to add some regularization and improve the CNN's generalization performance. Symbol crops were split into training (60%) and validation (40%) sets and trained the network to minimize cross-entropy loss on the validation set. Both the training and validation loss converged by 100 epochs of training. The training and validation sets were then combined to train a final model on the entire dataset for 100 epochs. In 11 unseen piping and instrumentation diagrams, tags were classified with 100% precision and 98% recall using a classification probability threshold of 0.95. LMIs were classified with 85% precision and 90% recall using a classification probability threshold of 0.95.

Computer Systems

Figure 6:
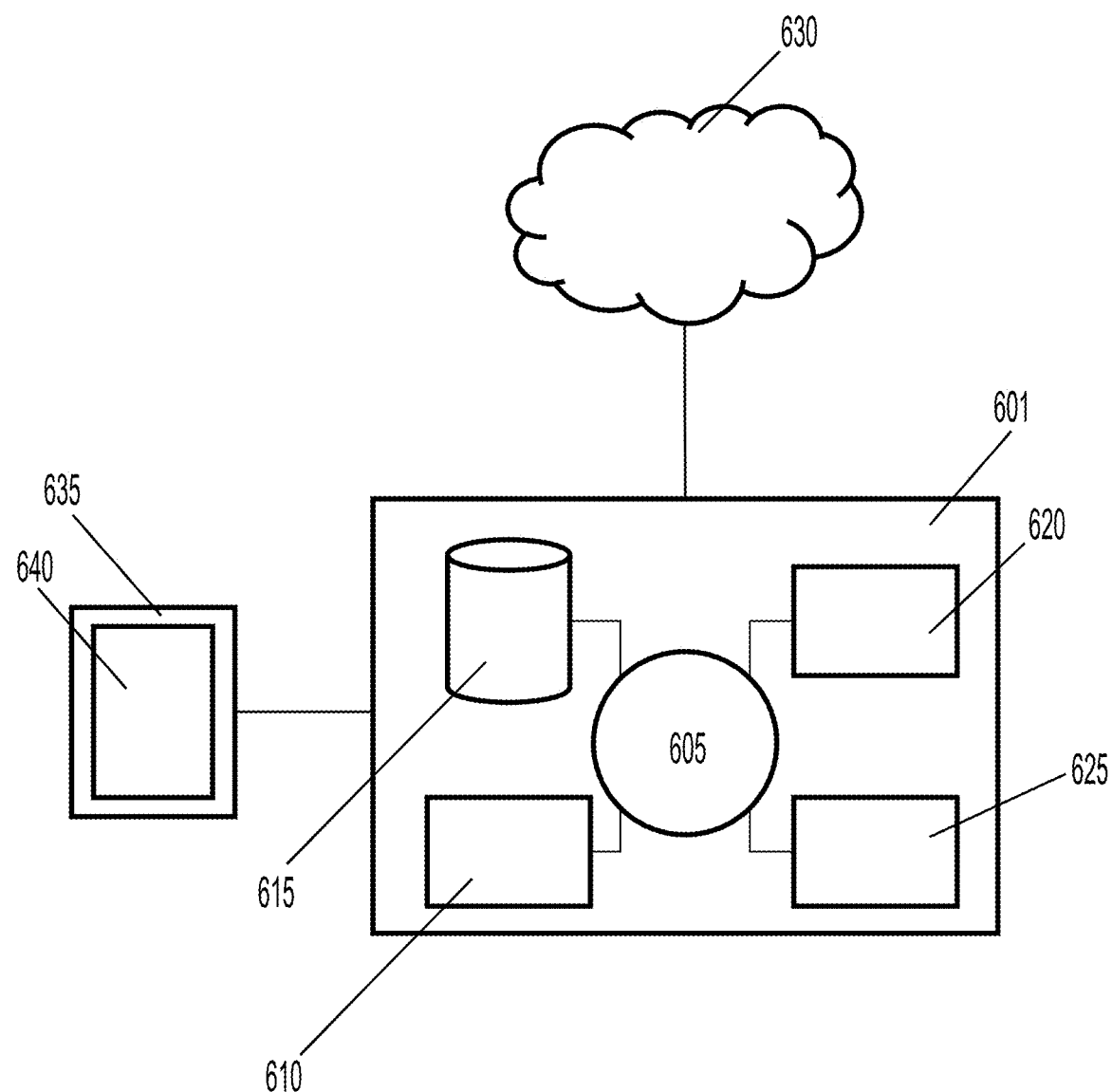
FIG. 6 shows a computer system that is programmed or otherwise configured to implement methods provided herein.

The present disclosure provides computer systems that are programmed to implement methods of the disclosure. FIG. 6 shows a computer system 601 that is programmed or otherwise configured to implement the system 100 of FIG. 1. The computer system 601 additionally regulate various aspects of the process of FIG. 5 of the present disclosure. The computer system 601 can be an electronic device of a user or a computer system that is remotely located with respect to the electronic device. The electronic device can be a mobile electronic device.

The computer system 601 includes a central processing unit (CPU, also "processor" and "computer processor" herein) 605, which can be a single core or multi core processor, or a plurality of processors for parallel processing. The computer system 601 also includes memory or memory location 610 (e.g., random-access memory, read-only memory, flash memory), electronic storage unit 615 (e.g., hard disk), communication interface 620 (e.g., network adapter) for communicating with one or more other systems, and peripheral devices 625, such as cache, other memory, data storage and/or electronic display adapters. The memory 610, storage unit 615, interface 620 and peripheral devices 625 are in communication with the CPU 605 through a communication bus (solid lines), such as a motherboard. The storage unit 615 can be a data storage unit (or data repository) for storing data. The computer system 601 can be operatively coupled to a computer network ("network") 630 with the aid of the communication interface 620. The network 630 can be the Internet, an internet and/or extranet, or an intranet and/or extranet that is in communication with the Internet. The network 630 in some cases is a telecommunication and/or data network. The network 630 can include one or more computer servers, which can enable distributed computing, such as cloud computing. The network 630, in some cases with the aid of the computer system 1101, can implement a peer-to-peer network, which may enable devices coupled to the computer system 1101 to behave as a client or a server.

The CPU 1105 can execute a sequence of machine-readable instructions, which can be embodied in a program or software. The instructions may be stored in a memory location, such as the memory 610. The instructions can be directed to the CPU 605, which can subsequently program or otherwise configure the CPU 605 to implement methods of the present disclosure. Examples of operations performed by the CPU 605 can include fetch, decode, execute, and writeback.

The CPU 605 can be part of a circuit, such as an integrated circuit. One or more other components of the system 601 can be included in the circuit. In some cases, the circuit is an application specific integrated circuit (ASIC).

The storage unit 615 can store files, such as drivers, libraries and saved programs. The storage unit 615 can store user data, e.g., user preferences and user programs. The computer system 601 in some cases can include one or more additional data storage units that are external to the computer system 601, such as located on a remote server that is in communication with the computer system 601 through an intranet or the Internet.

The computer system 601 can communicate with one or more remote computer systems through the network 630. For instance, the computer system 601 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 601 via the network 630.

Methods as described herein can be implemented by way of machine (e.g., computer processor) executable code stored on an electronic storage location of the computer system 601, such as, for example, on the memory 610 or electronic storage unit 615. The machine executable or machine-readable code can be provided in the form of software. During use, the code can be executed by the processor 605. In some cases, the code can be retrieved from the storage unit 615 and stored on the memory 610 for ready access by the processor 605. In some situations, the electronic storage unit 615 can be precluded, and machine-executable instructions are stored on memory 610.

The code can be pre-compiled and configured for use with a machine having a processor adapted to execute the code or can be compiled during runtime. The code can be supplied in a programming language that can be selected to enable the code to execute in a pre-compiled or as-compiled fashion.

Aspects of the systems and methods provided herein, such as the computer system 601, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 601 can include or be in communication with an electronic display 635 that comprises a user interface (UI) 640 for providing, for example, the digital model of FIG. 4. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 605. The algorithm can, for example, one of the neural networks described in this disclosure.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method for generating a digital representation of a system from engineering documents of the system comprising one or more schematics and a components table, the method comprising:
   (a) classifying, using a deep learning algorithm, (i) each of a plurality of symbols in the one or more schematics as a component and (ii) each group of related symbols as an assembly, wherein classifying each group of related symbols as an assembly comprises, for each group, detecting dashed lines in the one or more schematics that delineate the group;
   (b) determining connections between the components and the assemblies;
   (c) associating a subset of the components and the assemblies with entries in the components table; and
   (d) generating the digital representation of the system from the components, the assemblies, the connections, and the associations, wherein the digital representation of the system comprises at least a digital model of the system and a machine-readable bill of materials.

2. The method of claim 1, further comprising, prior to (a), preprocessing the one or schematics by removing white space or noise from the one or more schematics.

3. The method of claim 1, further comprising, prior to (a), determining a library of components to detect in the one or more schematics.

4. The method of claim 3, further comprising (i) determining that a respective symbol in the one or more schematics is not in the library of components and (ii) adding the respective symbol and its corresponding component to the library of components.

5. The method of claim 1, wherein (a) comprises detecting the plurality of symbols in the one or more schematics using a binary classifier, wherein the deep learning algorithm comprises the binary classifier, and wherein the detecting comprises a sliding window approach.

6. The method of claim 5, wherein (a) further comprises classifying each of the detected symbols as a component using a multi-class deep neural network, wherein the deep learning algorithm comprises the multi-class deep neural network.

7. The method of claim 5, wherein (a) further comprises classifying each of the detected symbols as a component using an autoencoder, wherein the deep learning algorithm comprises the autoencoder.

8. The method of claim 6, wherein the multi-class deep neural network is selected from the group consisting of: a feed-forward neural network and a convolutional neural network.

9. The method of claim 6, wherein the multi-class deep neural network is trained using a semi-supervised learning process.

10. The method of claim 1, wherein (a) comprises detecting and classifying the plurality of symbols in the one or more schematics using a single object detection algorithm.

11. The method of claim 1, wherein (b) comprises detecting solid lines connecting the components and the assemblies.

12. The method of claim 11, wherein the detecting comprises using a graph search algorithm.

13. The method of claim 1, wherein (c) comprises:
    detecting and identifying, in the one or more schematics, identification numbers associated with the components and the assemblies in the subset of components and assemblies using optical character recognition; and
    matching the detected identification numbers with identification numbers in the components table.

14. The method of claim 13, wherein detecting the identification numbers comprises using a Hough transform.

15. The method of claim 1, wherein the digital model comprises computer code that defines the components, the connections, and a state of the system.

16. The method of claim 15, wherein the digital model is a static model.

17. The method of claim 15, wherein the digital model is a time-varying model.

18. One or more non-transitory computer storage media storing instructions that are operable, when executed by one or more computers, to cause the one or more computers to perform operations comprising:
    (a) classifying, using a deep learning algorithm, (i) each of a plurality of symbols in one or more schematics as a component and (ii) each group of related symbols as an assembly, wherein classifying each group of related symbols as an assembly comprises, for each group, detecting dashed lines in the one or more schematics that delineate the group;
    (b) determining connections between the components and the assemblies;
    (c) associating a subset of the components and the assemblies with entries in a components table; and
    (d) generating a digital representation of a system from the components, the assemblies, the connections, and the associations, wherein the digital representation of the system comprises at least a digital model of the system and a machine-readable bill of materials.

* * * * *